United States Patent [19]

Strange et al.

[11] Patent Number: 4,537,958

[45] Date of Patent: Aug. 27, 1985

[54] PROCESS FOR PREPARING CELLULOSE ETHERS

[75] Inventors: Carl P. Strange, Walker; Harold B. Martin, Jr., Plaquemine; Albert C. Tsang, Baton Rouge, all of La.

[73] Assignee: The Dow Chemical Company, Midland, Mich.

[21] Appl. No.: 626,513

[22] Filed: Jun. 29, 1984

[51] Int. Cl.³ ............... C08B 11/20; C08B 11/22
[52] U.S. Cl. ............................. 536/85; 536/87; 536/88; 536/89; 536/91; 536/96
[58] Field of Search ............ 536/85, 87, 88, 89, 536/91, 96

[56] References Cited

U.S. PATENT DOCUMENTS

| | | | |
|---|---|---|---|
| 3,072,635 | 1/1963 | Menkart et al. | 536/85 |
| 3,347,847 | 10/1967 | Engelskirchen et al. | 536/85 |
| 3,356,519 | 12/1967 | Chambers et al. | 536/87 |
| 3,527,751 | 9/1970 | Gill | 536/96 |
| 3,709,876 | 1/1973 | Glomski et al. | 536/91 |
| 3,903,076 | 9/1975 | Krumel et al. | 536/85 |
| 4,400,502 | 8/1983 | Majewicz | 536/87 |

*Primary Examiner*—Ronald W. Griffin

[57] ABSTRACT

Non-gelling cellulose ethers are purified by mixing same with a dialdehyde under acidic conditions and under high agitation, forming a slurry of the treated cellulose ether, rapidly transferring the slurry to a filter and then dewatering said slurry.

8 Claims, No Drawings

PROCESS FOR PREPARING CELLULOSE ETHERS

BACKGROUND OF THE INVENTION

This invention relates to a process of purifying cellulose ethers and, in particular, to a process for purifying cellulose ethers which do not exhibit a gel point in liquid water.

Water-soluble cellulose ethers such as methyl cellulose, hydroxypropylmethyl cellulose, hydroxyethyl cellulose, hydroxyethylmethyl cellulose, hydroxypropyl cellulose, carboxymethyl cellulose, and the like are widely used as thickeners, binders, drug additives and for many other uses. Such cellulose ethers are commonly prepared by reacting cellulose pulp with sodium hydroxide and an etherifying agent such as methylchloride, ethyleneoxide, propyleneoxide, chloroacetic acid and the like. Because many side reactions occur during the etherification reaction, the crude cellulose ether contains substantial amounts of impurities such as salt and various glycol ethers. It is usually necessary to remove these impurities before the cellulose ether is ready for use.

Since these impurities are generally water-soluble, it would be desirable simply to wash the crude cellulose ether to dissolve the impurities therefrom. Unfortunately, however, the cellulose ether is itself water-soluble and accordingly, water washing to remove impurities results in substantial loss of product as well.

Certain cellulose ethers such as methyl cellulose and hydroxypropylmethyl cellulose exhibit an inverse solubility in water with rising temperature. That is, as the temperature of the water increases, the cellulose ether becomes less and less soluble therein. For such cellulose ethers, there is typically a characteristic gel temperature above which the cellulose ether is not water-soluble. Such gelling cellulose ethers may be water washed by conducting the washing step above the gel temperature of the cellulose ether.

Unfortunately, other cellulose ethers such as hydroxyethyl cellulose and hydroxyethylmethyl cellulose do not exhibit such a gel point at any temperature below the boiling point of water. Accordingly, one cannot solve the washing problem simply by using hot water to conduct the washing. It is therefore necessary to employ some other means to purify these non-gelling cellulose ethers.

It is known to render such non-gelling cellulose ethers temporarily insoluble in water by crosslinking them with a dialdehyde such as glyoxal. For example, in U.S. Pat. Nos. 3,347,847 and 3,527,751 hydroxyalkyl cellulose is prepared as a suspension in isopropanol or an isopropanol/water azeotrope. The crude hydroxyalkyl cellulose is, while in the presence of said azeotrope, treated with acid and glyoxal to crosslink it for water washing.

Similarly, in U.S. Pat. No. 3,709,876, hydroxyethylmethyl cellulose is prepared in a dry process (i.e., without liquid diluent) and is subsequently treated with glyoxal and acid to render it temporarily water-insoluble for washing.

Unfortunately, however, these prior art processes have distinct disadvantages. For example, the process described in U.S. Pat. Nos. 3,347,847 and 3,527,751 both require the use of an organic solvent to prepare and wash the cellulose ether. Thus, this organic solvent must be later removed from the cellulose ether, which presents the common problems normally associated with solvent recovery.

The process of U.S. Pat. No. 3,709,876, while free of the disadvantages associated with the use of organic solvents, requires treating the cellulose ether with a relatively high (5 to 15 percent treatment level) amount of glyoxal to sufficiently crosslink the cellulose ether for washing. In addition, despite the glyoxal treatment, large amounts of the crude cellulose ether remain water-soluble and are subsequently lost during the water washing step. For these reasons, the efficiency of the process of U.S. Pat. No. 3,709,876 is far lower than desired.

Accordingly, it would be desirable to provide a process for purifying crude non-gelling cellulose ethers in which the use of organic solvents is not required and low amounts of the crude cellulose ether are dissolved or otherwise lost during the purification process.

SUMMARY OF THE INVENTION

This invention is such a process for purifying a crude non-gelling water-soluble cellulose ether. The process comprises first mixing, under high agitation, a crude non-gelling water-soluble cellulose ether with from about 1 to about 5 percent by weight of said cellulose ether of a dialdehyde under acidic conditions whereby the cellulose ether is rendered water-insoluble. Then, the water-insoluble cellulose ether is formed into an aqueous slurry which is transferred to a filter by means of a slurry pump such that substantially none of the cellulose ether becomes dissolved in the water. Said slurry is subsequently dewatered on a filter to remove water-soluble impurities therefrom.

The process of this invention provides several distinct advantages over prior art processes. First, the amount of dialdehyde necessary to satisfactorily render the cellulose ether water-insoluble is substantially reduced in this process. Additionally, the time required to obtain a satisfactorily crosslinked crude cellulose ether is substantially reduced from the time required in the prior art process. Additionally, the cellulose ether is more completely rendered water-insoluble using the process of this invention as compared to prior art processes. Because of these advantages, a faster, less expensive, more effective means of washing the crude cellulose ether is provided.

DETAILED DESCRIPTION OF THE INVENTION

The cellulose ether employed herein is one which is soluble in water at all temperatures below the boiling point of water at atmospheric pressure (i.e., below about 100° C.). Such cellulose ethers are referred to herein as "non-gelling" cellulose ethers because they do not form gelatinous precipitates as an aqueous solution thereof is heated to its boiling point.

Suitable such non-gelling cellulose ethers include, for example, hydroxyethyl cellulose, hydroxyethylmethyl cellulose, carboxymethylhydroxyethyl cellulose, carboxymethylhydroxyethylmethyl cellulose, hydroxyethylhydroxypropyl cellulose, dihydroxypropyl cellulose, dihydroxypropylhydroxyethyl cellulose and like cellulose ethers.

The crude cellulose ether employed herein contains impurities which are capable of being removed from the cellulose ether by water washing. Preferably, said impurities comprise materials that are water-soluble. Said impurities are generally by-products of the etherification reaction of cellulose (i.e., salt and diverse water-soluble glycols and glycol ethers and the like).

Advantageously, the crude cellulose ether is prepared in a dry process as described, for example, in U.S. Pat. No. 3,709,876. Alternatively, the crude cellulose ether is prepared in a slurry in a liquid organic diluent. However, if such a diluent is employed it is preferred to remove substantially all of said diluent before purifying the cellulose ether according to this process.

In the first step of the process of this invention, the crude cellulose ether is mixed with from about 1 to about 5 percent by weight of said cellulose ether of a dialdehyde under acidic conditions. While many relatively low molecular weight dialdehydes are useful herein, glyoxal is preferred. Said mixing is advantageously performed at a pH from about 1 to about 6, preferably from about 2 to about 4. Adjustment of the pH of the crude cellulose ether is advantageously made by adding a weak organic acid, such as acetic, citric or, especially, formic acid. Most preferably, the crude cellulose ether is mixed with a treating solution comprising water, formic acid and glyoxal containing sufficient amounts of formic acid to adjust the pH into the aforementioned ranges and from about 1 to about 5 percent by weight of the cellulose ether of glyoxal.

The aforementioned treatment is made under conditions of high agitation. In general, the agitation is such that the dialdehyde becomes thoroughly mixed with the cellulose ether within about 30 seconds of contact therewith.

Said mixing may be performed in any suitable mixing apparatus which provides an adequate shear rate as described hereinbefore. Especially suitable are high intensity mixers such as are available commercially from Welex, Incorporated, Blue Bell, Pa.

Upon mixing the crude cellulose ether and the dialdehyde, the crude cellulose ether becomes temporarily crosslinked within about 1 to 15, preferably about 1 to 5 minutes after said mixing is begun. After said crosslinking has progressed to a point where the cellulose ether is rendered insoluble in water, the crude crosslinked cellulose ether is formed into an aqueous slurry by the addition of water. Sufficient water is employed to form a relatively dilute slurry. Generally, from about 10 to about 100, preferably about 20 to about 40 parts by weight of water are employed per part of crosslinked cellulose ether. The temperature of the water in said slurry may range from ambient to 100° C. but is preferably from about 15° to about 30° C.

The resulting slurry is then transferred to a suitable filter by means of a slurry pump such that dewatering of the slurry is begun before significant amounts of the cellulose ether can dissolve in the water. In this invention, it is desirable to minimize the time in which the cellulose ether is in contact with the wash water. Accordingly, the particular slurry pump employed is chosen in order to minimize the contact time. Preferred slurry pumps include screw feeders, volumetric screw feeders, and especially, progressive cavity pumps such as are sold under the name Moyno Quick Disassembly Pumps, by Moyno Pump Division of Robbins and Myers, Springfield, Ohio. In many of such slurry pumps, both the contact of the cellulose ethers into the wash water and transfer of the resulting slurry are accomplished in the pump in one operation.

Water may be removed on the filter by gravitation or by the use of vacuum pulling equipment. Any suitable filter may be employed herein, but one which permits the continuous dewatering of the slurry, such as a straight line belt filter is preferred. Sufficient water is removed such that the resulting purified cellulose ether has a moisture content from about 10 to about 80 percent, preferably 40–60 percent based on the weight of the cellulose ether.

If desired, the resulting purified cellulose ether may be further washed while on the filter to remove additional impurities therefrom. Each such washing is, of course, followed by dewatering to a moisture content as described hereinbefore.

The resulting purified cellulose ether can be again rendered water-soluble by the addition of an aqueous base such as a dilute sodium hydroxide solution. The glyoxal crosslinks in said cellulose ether are hydrolyzed under basic conditions thereby destroying the crosslinks and restoring the solubility of the cellulose ether. If desired, however, the cellulose ether may be employed in the crosslinked form. Such crosslinks will slowly hydrolyze even under neutral conditions to form a water-soluble product.

A major advantage of the process of this invention is that the entire treating and washing time is reduced from a typical 2 to 3 hours when using conventional processes, to about 1 to 1.5 hours. In addition, the amount of dialdehyde crosslinking agent necessary to render the cellulose ether water-insoluble is also significantly reduced. Still another advantage is that using this process, the crosslinking of the crude cellulose ether is much more uniform and complete than the crosslinking afforded by conventional processes. Accordingly, losses of product during the washing step are greatly reduced. Typically, less than 10, preferably less than about 7, more preferably less than about 5 percent of the crude cellulose ether is lost during the washing process. Using conventional processes, the said filtered losses are often as high as 40 percent of the weight of the crude cellulose ether.

The cellulose ether purified according to this process may be used for the same purposes and in like manner as similar cellulose ethers which are purified using conventional processes. In particular, said cellulose ethers are useful as thickeners, rheology modifiers, surfactants, binders, adhesives, protective coatings and like applications.

The following examples are provided to illustrate the invention, but not to limit the scope thereof. All parts and percentages are by weight unless otherwise indicated.

EXAMPLE 1

Into a 6 liter steam-jacketed laboratory Welex blender, are added 674.6 grams (g) of a crude hydroxyethylmethyl cellulose containing about 76.3 percent by weight HEMC, 12 percent by weight salt and 11.7 percent by weight organic impurities. The Welex blender is turned on to 1500 rpm. The jacket is heated with steam and water so that the temperature of the crude HEMC is 75° C. To the heated crude HEMC is added 33.7 g of a 32 percent glyoxal, 18 percent formic acid and 50 percent water solution. The amount of this solution added is 5 percent by weight of the cellulose ether (on a crude basis). After the addition of the glyoxal solution, the temperature of the HEMC is cooled to 40° C. The product is then slurried in 5,000 ml cold water for 10 minutes and then filtered. Of the original HEMC, 94.6 percent is recovered from the filter. Only 3.0 percent of the original HEMC (on a purified basis) is found to be dissolved in the wash water.

EXAMPLE 2

Into a Welex blender operating at 500 rpm are added 70.6 lbs of a crude HEMC. Said crude HEMC contains 35 lbs of a hydroxyethylmethyl cellulose having a methoxy degree of substitution of 0.94 and hydroxyethyl molar substitution of 2.23. To the blender is then added 1.4 lbs of a treating solution containing 50 percent water, 32 percent glyoxal and 18 percent formic acid. This corresponds to the addition of 2 percent glyoxal by weight of the HEMC (on a purified basis). The treating solution and crude HEMC are mixed in the Welex blender for 30 minutes and then transferred to a Moyno progressive cavity pump. To the pump are gradually added 2585 lbs of cold water to form a slurry of the crude HEMC. The slurry is then pumped onto a straight line belt filter where it is dewatered. From the belt filter are recovered 110 lbs of product of which 31.9 lbs are HEMC (dry). Total recovery of the product is 93 percent. The purified product contains 2.6 percent salt and trace amounts of other organic impurities. Total time required for the treating slurry formation and dewatering steps is 30 minutes.

COMPARATIVE EXAMPLE NO. C-1

A 27.6 lb portion of crude HEMC (14.5 lbs HEMC on a purified basis) are heated to 80° C. and sprayed with a treating solution containing 50 percent water, 32 percent glyoxal and 18 percent formic acid. Sufficient treating solution is added so that 7 percent by weight of the HEMC (purified basis) of glyoxal is added to the crude HEMC. After the addition of treating solution, the HEMC is agitated at 500 rpm for 15 minutes and then cooled to 40° C. The resulting product is then water-insoluble. The insolubilized product is washed by filling the reactor with water and then pressuring the mixture to a slurry tank. From a slurry tank the mixture is dumped into a belt line filter. A vacuum of 10 mm mercury is pulled on the filter. The product is then manually taken from the filter, weighed and analyzed. The resulting product contains 72 percent moisture. Of the HEMC treated in this manner, only 91 percent is recovered. The total time required for purification is about 150 minutes.

What is claimed is:

1. A process for purifying a crude non-gelling water-soluble cellulose ether comprising (a) mixing under high agitation, a crude non-gelling water-soluble cellulose ether prepared in a dry process, or in a slurry in a liquid organic diluent, wherein substantially all of the diluent has been removed; with from about 1 to about 5 percent by weight of said cellulose ether of a dialdehyde under acidic conditions, whereby the cellulose ether is rendered substantially water-insoluble, (b) forming an aqueous slurry of the crosslinked cellulose ether, (c) transferring said slurry to a filter by means of a slurry pump such that substantially none of the cellulose ether becomes dissolved in the water and (d) dewatering said slurry on a filter to remove water-soluble impurities therefrom.

2. The process of claim 1 further comprising the additional step of washing said dewatered slurry with water.

3. The process of claim 1 wherein the dialdehyde is glyoxal.

4. The process of claim 3 wherein in step (a) the crude non-gelling water-soluble cellulose ether is mixed with an aqueous solution of glyoxal and an organic acid.

5. The process of claim 4 wherein said organic acid is formic acid.

6. The process of claim 1 wherein less than about 7 percent of the cellulose ether is dissolved in said process.

7. The process of claim 1 wherein said mixing is performed in a high intensity mixer.

8. The process of claim 7 wherein said slurry is formed in a progressive cavity pump.

* * * * *